United States Patent [19]

Ishida

[11] Patent Number: 5,010,481
[45] Date of Patent: Apr. 23, 1991

[54] MAIN MEMORY CONTROL SYSTEM FOR VIRTUAL MACHINE

[75] Inventor: Tomoyuki Ishida, Tokyo, Japan

[73] Assignee: NEC Corporation, Tokyo, Japan

[21] Appl. No.: 254,709

[22] Filed: Oct. 7, 1988

[30] Foreign Application Priority Data

Oct. 9, 1987 [JP] Japan .............................. 62-255842

[51] Int. Cl.$^5$ .......................................... G06F 12/08
[52] U.S. Cl. ................................ 364/200; 364/232.1; 364/243.1; 364/245.7
[58] Field of Search ... 364/200, 300, 900, 200 MS File, 364/900 MS File

[56] References Cited

U.S. PATENT DOCUMENTS

| | | | |
|---|---|---|---|
| 4,494,188 | 1/1985 | Nakane et al. | 364/200 |
| 4,528,624 | 7/1985 | Kamionka et al. | 364/200 |
| 4,831,541 | 5/1989 | Eshel | 364/200 |

Primary Examiner—Gareth D. Shaw
Assistant Examiner—Matthew C. Fagan
Attorney, Agent, or Firm—Foley & Lardner

[57] ABSTRACT

A system for controlling virtual main memories (VMMs) of a plurality of virtual machines (VMs) which has a section for detecting an overload state of a VMM of any VM, a section for requesting a VMM corresponding to a required capacity in response to the detection. The system also includes a section for monitoring load states of the VMMs of other VMs in response to this request, a section for selecting an unbusy VM in accordance with the monitoring, a section for releasing the VMM corresponding to the requested capacity from the selected VM, and a section for supplying the released VMM to the VM requesting a VMM.

2 Claims, 8 Drawing Sheets

MAIN MEMORY CONTROL SYSTEM FOR VIRTUAL MACHINE

BACKGROUND OF THE INVENTION

The present invention relates to a system for controlling a main memory of a virtual machine.

In a conventional main memory control system for a virtual machine, the capacity of a main memory of the virtual machine is determined when the virtual machine is generated, and is fixed until the corresponding virtual machine is erased. Therefore, during an operation of a plurality of virtual machines, or when the main memory of a given virtual memory is in an overload state or is busy, even if another virtual memory having an unbusy main memory is present, the unbusy main memory resource of the virtual machine cannot be partially released and assigned as the main memory resource of the busy virtual machine. As a result, the main memory resources are inappropriately assigned.

SUMMARY OF THE INVENTION

It is an object of the present invention to provide a system capable of flexibly and appropriately assigning main memory resources to a plurality of virtual machines.

According to the present invention, there is provided a main memory control system for a virtual machine system in which a plurality of virtual machines are realized on a real machine by assigning portions of the main memory of the real machine as respective virtual main memories of the virtual machines, comprising: a section for detecting a storage overload state for the virtual main memory of a given virtual machine; a section for requesting another virtual main memory having an unused storage capacity corresponding to a capacity necessary to avoid such a storage overload in response to detection of the virtual main memory overload state by the detecting section; a section for monitoring load states of all other virtual main memories of the other virtual machines in response to the request from the requesting section; a section for selecting a virtual machine whose virtual main memory is not busy from the other virtual machines, the load states of the virtual main memories of which are monitored by the monitoring section; a releasing section for releasing the virtual main memory having an unused storage capacity corresponding to the capacity requested by the virtual main memory request section from the one virtual machine; a virtual main memory ready completion informing section for informing the virtual machine requesting the virtual main memory in response to completion of release of the virtual main memory by the virtual main memory releasing section that the virtual main memory is ready to be obtained; and a virtual main memory supply section for supplying the virtual main memory corresponding to the requested capacity in response to the information from the virtual main memory ready completion informing means.

DETAILED DESCRIPTION OF THE PREFERRED EMBODIMENT

The present invention will be described hereinafter in detail with reference to the accompanying drawings.

Figure 1:
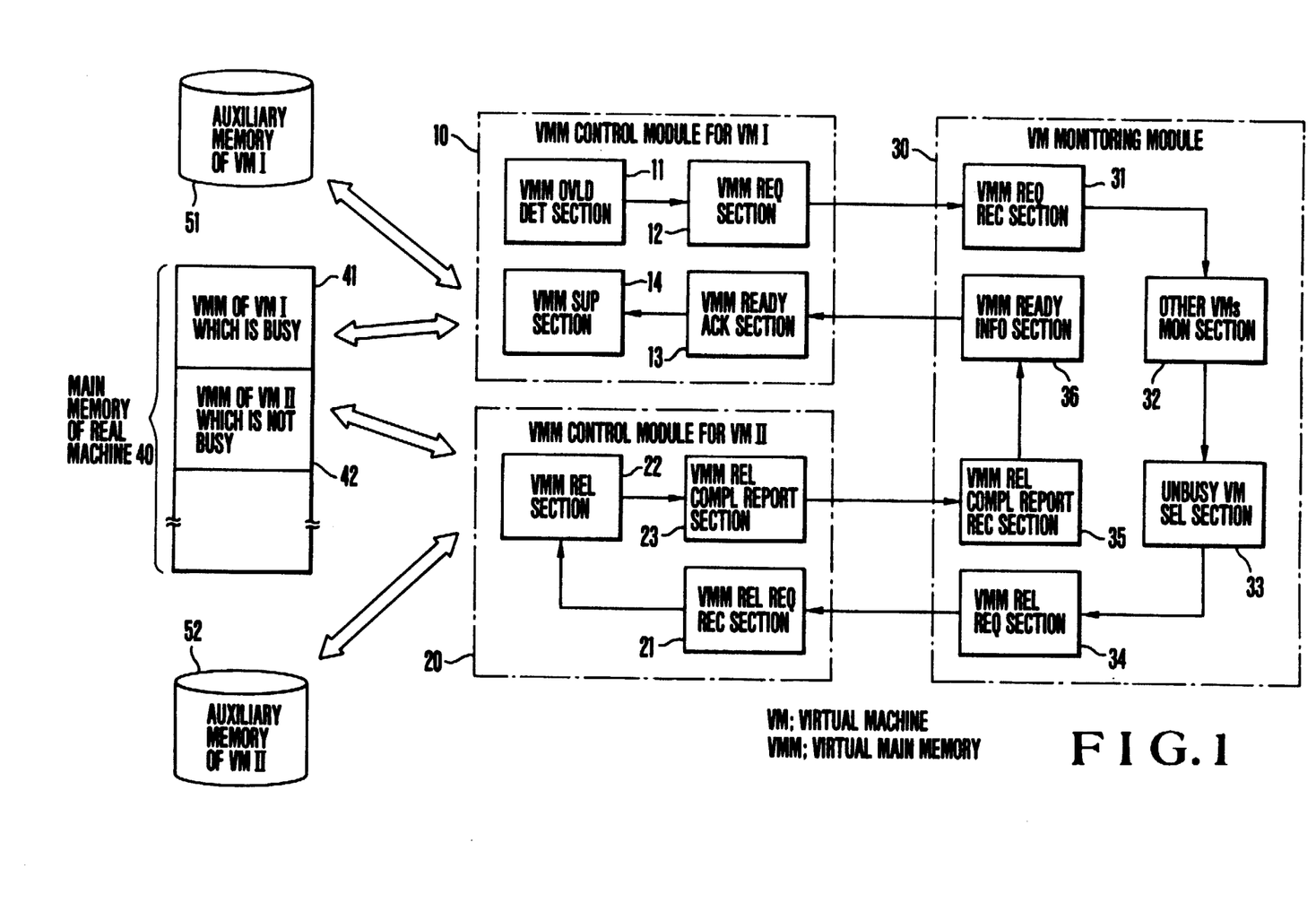
FIG. 1 is a block diagram showing an embodiment of the present invention.

Referring to FIG. 1, an embodiment of the present invention is a system wherein a plurality of virtual machines (VMs) are realized on a real machine, and virtual main memories (VMMs) 41 and 42 of the virtual machines are realized by partially assigning a main memory 40 of the real machine.

The system according to the embodiment of the present invention includes a VMM control module 10 for controlling a VM whose VMM is busy (or in a storage state), a VMM control module 20 for controlling a VM whose VMM is not busy, and a VM monitoring module 30 for monitoring a load state of the main memories of all the virtual machines.

The VMM control module 10 has a VMM overload state detection (VMM OVLD DET) section 11 for detecting the overload state of the VMM of the VM, a VMM request (VMM REQ) section 12 for sending a request, to the VM monitoring module 30, for another VMM of the necessary storage capacity in response to a detection output from the VMM OVLD DET section 11, a VMM ready acknowledgement receiving (VMM READY ACK REC) section 13 for receiving an acknowledgement from the VM monitoring module 30 indicating that the other VMM is ready, and a VMM supply (VMM SUP) section 14 for supplying the other VMM having the necessary storage capacity prepared in response to the output from the VMM READY ACK REC section 13.

The VMM control module 20 comprises a VMM release request receiving (VMM REL REQ REC) section 21 for receiving a VMM release request from the VM monitoring module 30, a VMM release (VMM REL) section 22 for releasing a VMM corresponding to a capacity based on the release request received at the section 21, and a VMM release completion report (VMM REL COMPL REPORT) section 23 for reporting to the VM monitoring module 30 that release of the VMM having an unused storage capacity corresponding to the requested capacity is completed by the section 22.

The VM monitoring module 30 has a VMM request receiving (VMM REQ REC) section 31 for receiving a request from the VMM REQ section 12 of the VMM control module 10, a VMM load state monitoring (OTHER VMs MON) section 32 for monitoring the load states of VMMs of VMs based on the request received at the section 31, an unbusy-VMM-VM selection (UNBUSY VM SEL) section 33 for selecting a VM having an unbusy VMM from the VMs monitored by the section 32, a VMM release request (VMM REL REQ) section 34 for requesting release of the VMM having an unused storage capacity corresponding to the requested capacity of the VM selected by the section 33 to the VMM control module 20, a VMM release completion report receiving (VMM REL COMPL REPORT REC) section 35 for receiving a report of completion of release of the VMM performed by the VMM control module 20 based on the release request, and a VMM ready informing (VMM READY INFO) section 36 for informing the VMM control module 10, in response to information received at the section 35, that the obtaining of the VMM is ready.

The operation of the embodiment of the present invention will be described with reference to the flow charts shown in FIGS. 2 to 8.

Assume that the VMM 41 of a VM I shown in FIG. 1 is busy, and the VMM 42 of a VM II is not busy.

Figure 2:
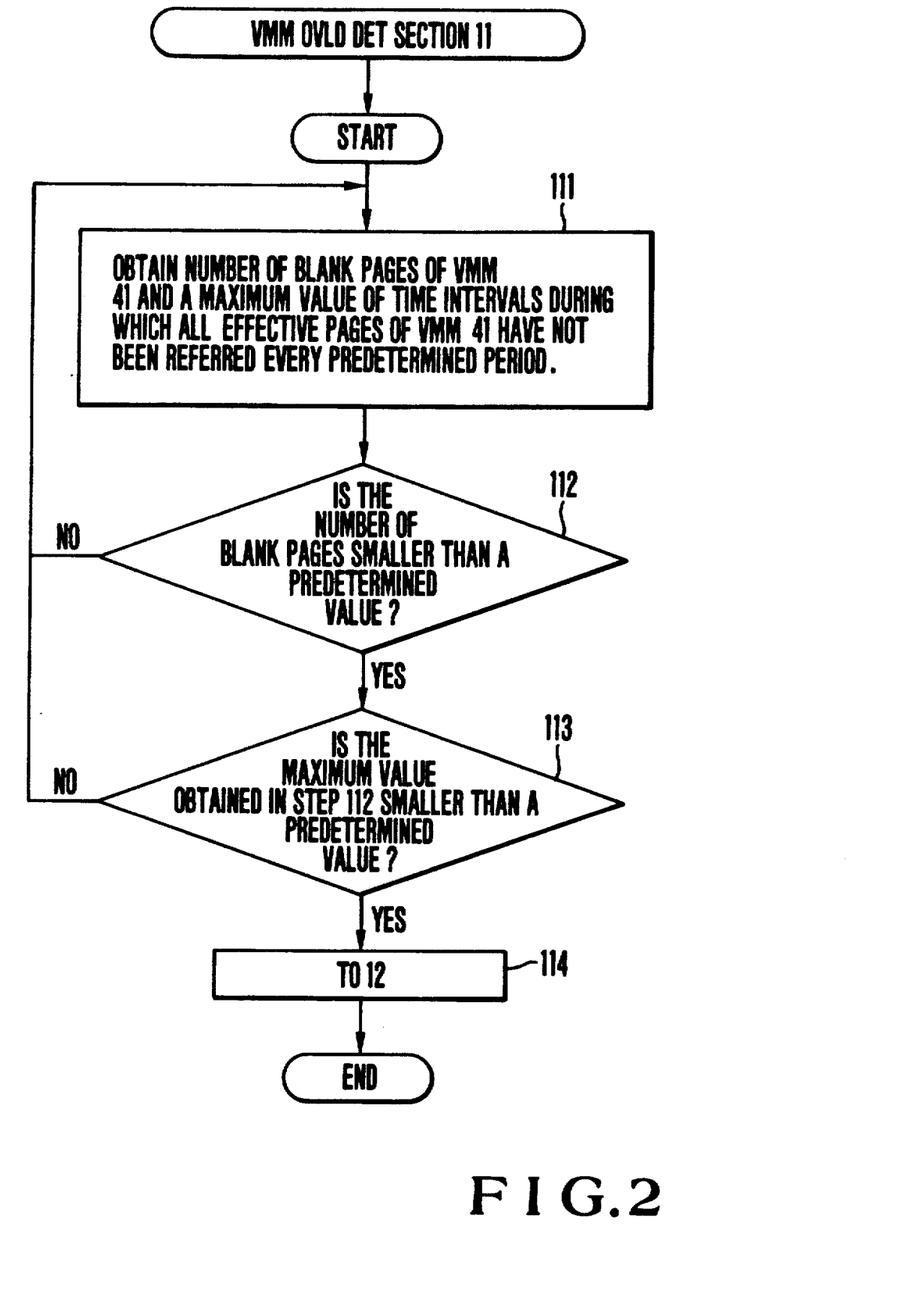
FIGS. 2 to 8 are flow charts for explaining operations of respective sections of the embodiment shown in FIG. 1.

The VMM control module 10 causes the VMM OVLD DET section 11 to detect the overload state of the VMM 41, as shown in the flow chart of FIG. 2.

In step 111 of FIG. 2, the number of blank pages of the VMM 41 and a maximum value of time intervals during which all effective pages of the VMM 41 have not been referred are obtained for every predetermined period. In step 112, if it is determined that the number of blank pages is not smaller than a predetermined value, the flow return to step 111 and if the number of blank pages is smaller than the predetermined value, the flow advances to step 113. If it is determined in step 113 that the maximum value of time intervals during which all effective pages of the VMM 41 have not been referred is not smaller than the predetermined value, the flow returns to step 111; otherwise, the flow advances to step 114. In step 114, control of the flow is transferred to the VMM REQ section 12.

Figure 3:
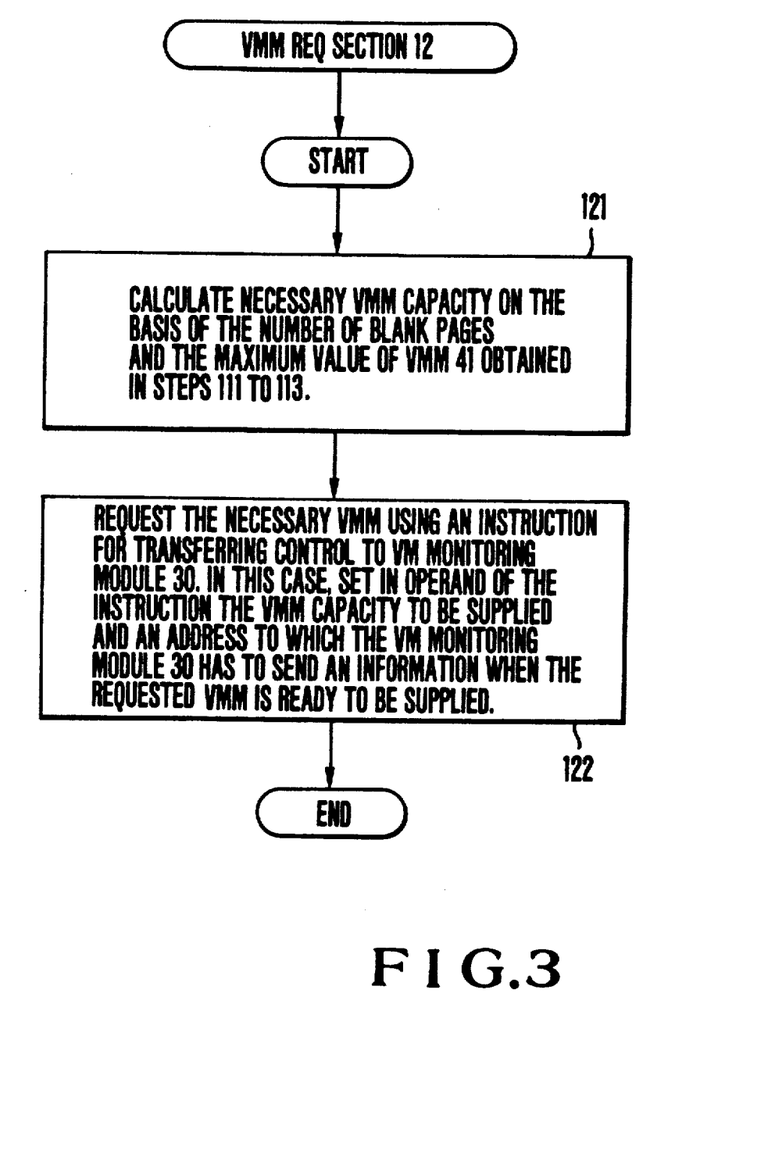

The VMM REQ section 12 requests a VMM corresponding to a necessary capacity to the VM monitoring module 30, as shown in the flow chart of FIG. 3. In step 121 in FIG. 3, a necessary VMM capacity is calculated on the basis of the number of blank pages of the VMM 41 and the maximum value of time intervals during which all effective pages of the VMM 41 have not been referred. In step 122, the necessary VMM is requested using an instruction for transferring control to the VM monitoring module 30. In this case, the VMM capacity to be supplied and an address to which the VM monitoring module 30 has to send information when the requested VMM is ready to be supplied are set in an operand of the instruction.

Figure 4:
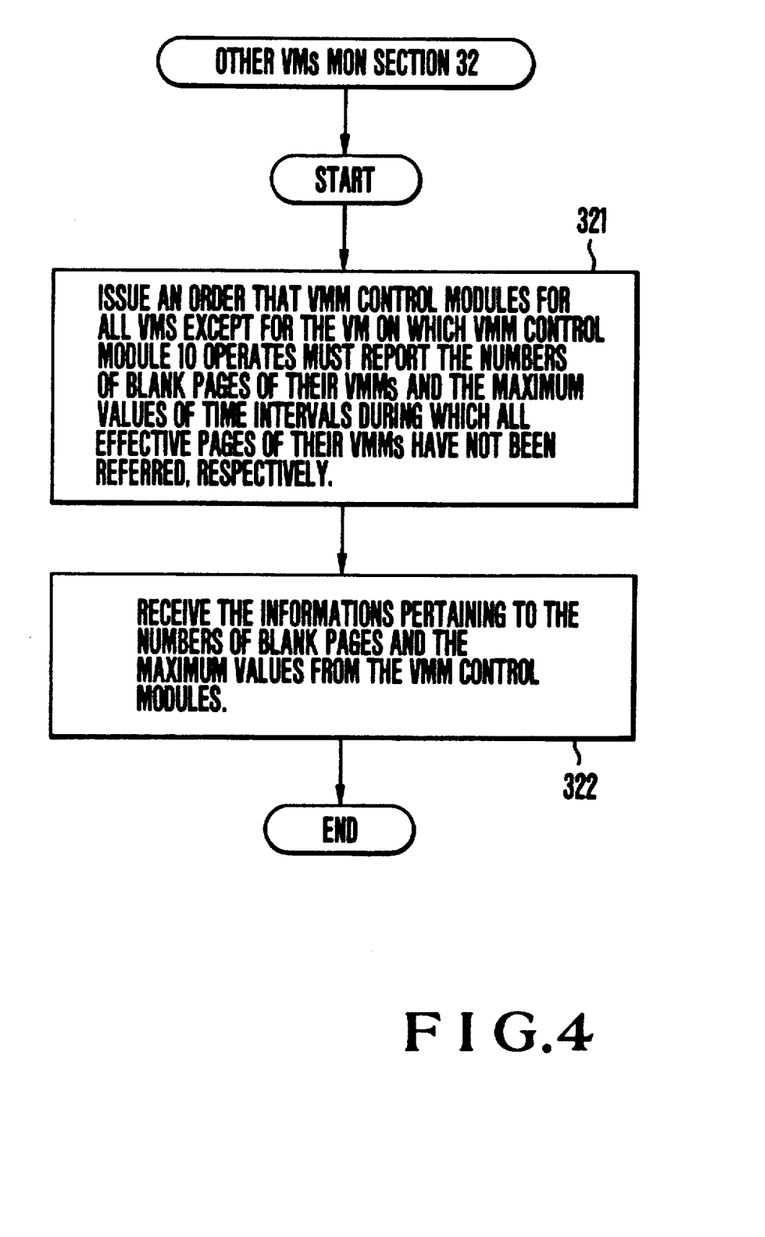

When the VMM monitoring module 30 receives the request from the VMM control module 10 at the VMM REQ REC section 31, it causes the OTHER VMs MON section 32 to monitor the load states of the VMMs of other VMs than the VM requesting VMM, as shown in the flow chart of FIG. 4.

In step 321 in FIG. 4, an order is issued that VMM control modules for all VMs except for the VM on which the VMM control module 10 operates must report the numbers of blank pages of their VMMs and the maximum values of the time intervals during which all effective pages have not been referred. In step 322, the informations pertaining to the numbers of blank pages of the VMMs and the maximum values of the time intervals during which all effective pages have not been referred are received from the VMM control modules for all VMs except for the VM on which the VMM control module 10 operates.

Figure 5:
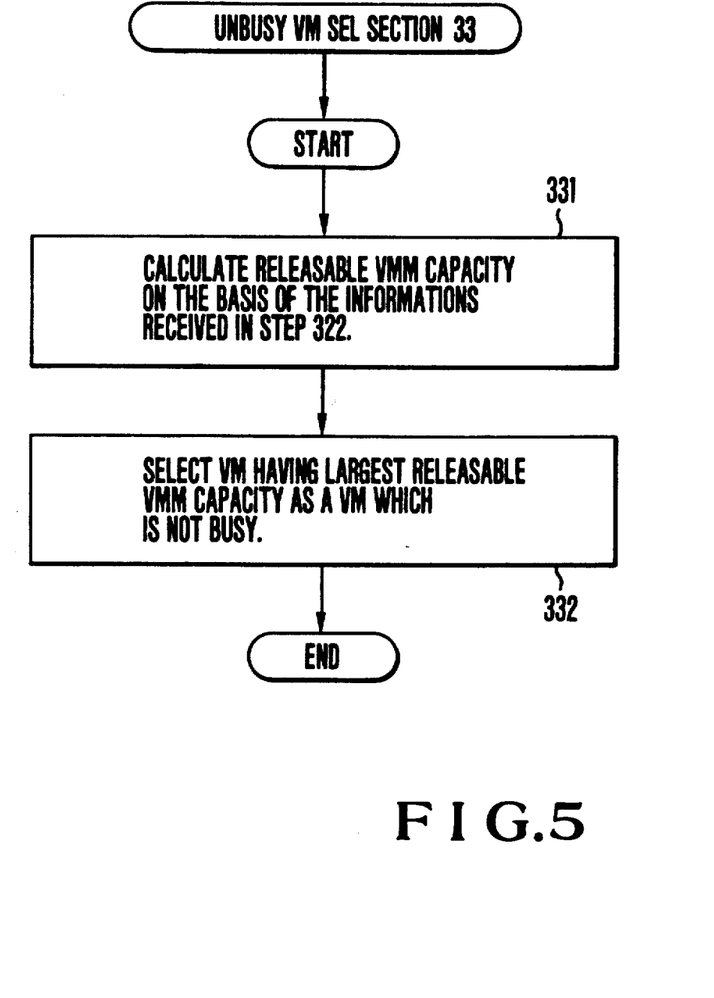
Figure 6:
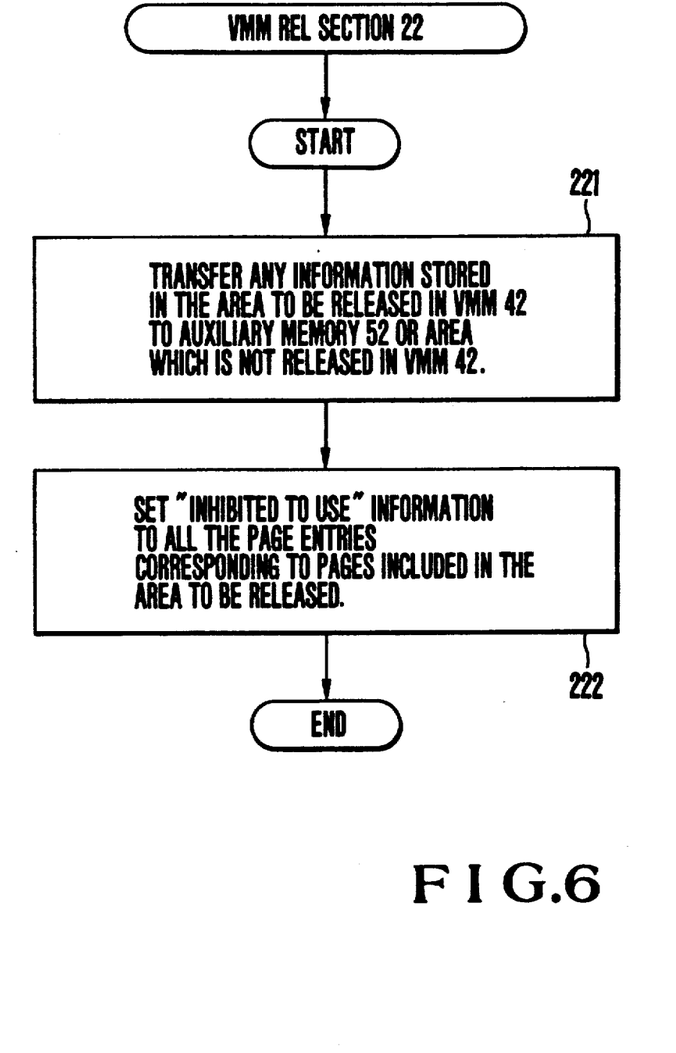
Figure 7:
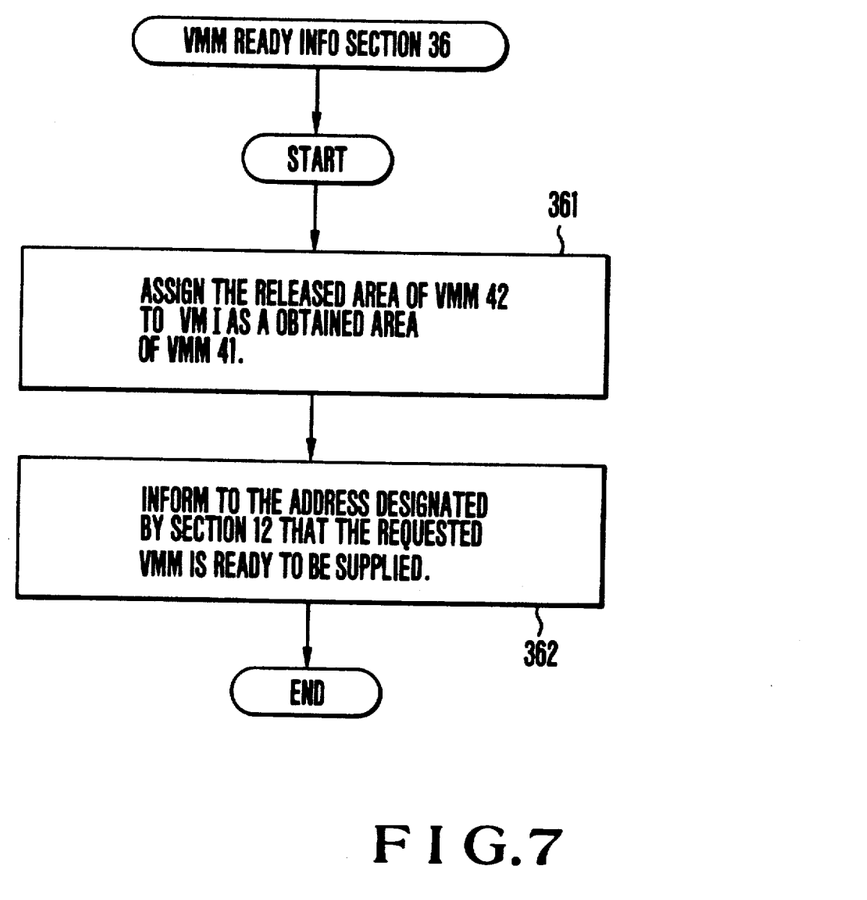
Figure 8:
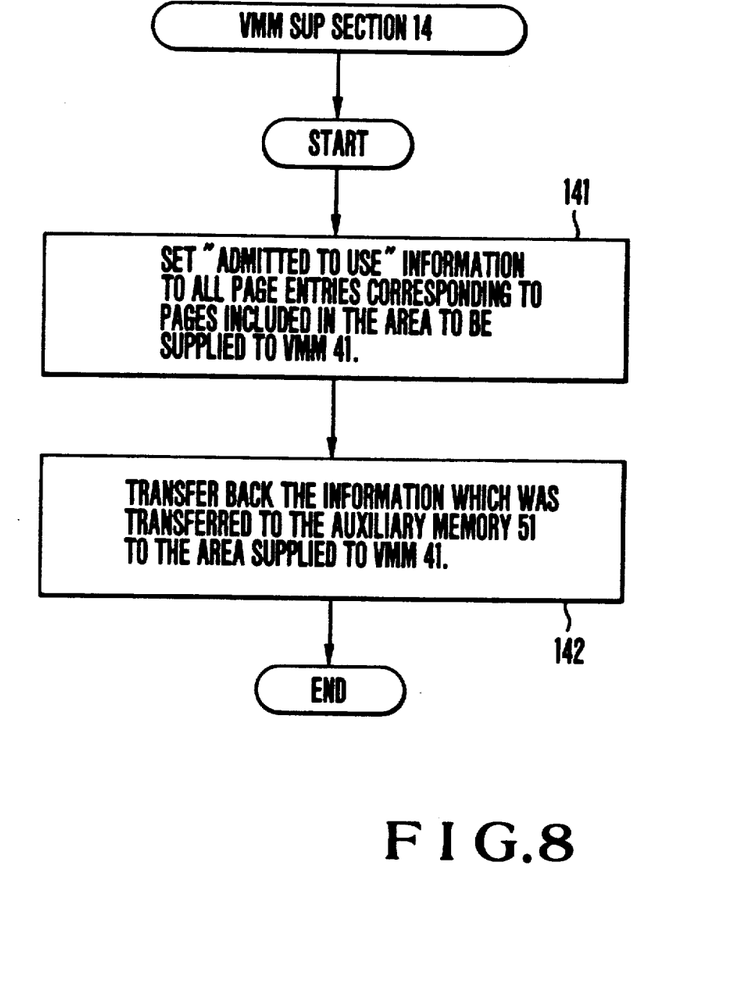

In the flow chart shown in FIG. 5, the UNBUSY VMM SEL section 32 selects a VM whose VMM is not busy from the VMs, the VMM load states of which are monitored by the section 32. In step 331 in FIG. 5, a releasable VMM capacity is calculated on the basis of the numbers of blank pages of the VMMs and the maximum values of the time intervals during which all effective pages have not been referred for all the VMs except for the VM on which the VMM control module 10 operates. In step 332, a VM having the largest releasable VMM capacity is selected as a VM which is not busy.

The VMM REL REQ section 34 requests release of the VMM corresponding to a capacity requested by the VMM control module 10 at the section 31 to the VMM control module 20. When the VMM control module 20 receives the request from the VM monitoring module 30 at the VMM REL REQ REC section 21, it causes the VMM REL section 22 to control the VMM 42 and an auxiliary memory 52, and releases the VMM 42 by the capacity requested by the section 21. In step 221 in FIG. 6, any information stored in the area to be released in the VMM 42 is transferred to the auxiliary memory 52 or an area which is not released in the VMM 42. In step 222, "inhibited to use" information is set to all the page entries corresponding to pages included in the VMM area to be released.

The VMM REL COMPL REPORT section 23 reports completion of VMM release to the VM monitoring module 30. When the VM monitoring module 30 receives the report from the section 23 at the VMM REL COMPL REPORT REC section 35, it causes the VMM READY INFO section 36 to inform to the VMM control module 10 that the VMM having unused storage capacity corresponding to the capacity requested by the VMM control module 10 at section 31 is ready to be obtained, according to the flow chart shown in FIG. 7. In step 361 in FIG. 7, a VMM area of the real machine to which the released area of the VMM 42 is assigned is assigned as an obtained VMM area of the VMM 41. In step 362, it is informed to the address designated by the section 12 that the requested VMM is ready to be supplied.

When the VMM control module 10 receives at the section 13 the completion report that the requested VMM is ready to be supplied, it causes the VMM SUP section 14 to obtain the VMM corresponding to the capacity indicated by the completion report received at the section 13, thereby expanding the area of the VMM 41, and loads information stored in the auxiliary memory 51 to the VMM 41. In step 141 in FIG. 8, "admitted to use" information is set to all page entries corresponding to pages included in the area to be supplied to the VMM 41. In step 142, the information which was transferred to the auxiliary memory 51 is transferred back to the area supplied to the VMM 41.

As described above, according to the present invention, the overload state of the VMM of the VM is acknowledged to the VM monitoring module, and the VMM of another VM whose VMM is not busy is released and is assigned to the busy VMM of the VM, so that assignment of the VMMs of the VMs can be optimized.

What is claimed is:

1. A virtual main memory control system coupled for use with a real data processing machine coupled to a real main memory, said real machine having a plurality of virtual data processing machines and said real main memory having a plurality of virtual main memories, each virtual main memory of said plurality of virtual main memories having a dedicated relationship with only one respective virtual machine of said plurality of virtual machines, having a given data storage capacity and providing a storage overload indication when storage requirements of a respective virtual machine are in excess of said given capacity, said virtual main memory control system comprising:

mean for detecting said storage overload indication for one virtual main memory of said plurality of virtual maim memories, having said dedicated relationship with a respective one virtual machine of said plurality of virtual machines having given storage requirements:

means for requesting access to another virtual main memory of said plurality of virtual main memories for said one virtual machine in response to said means for detecting;

means for monitoring said plurality of virtual main memories to locate at least one of said plurality of virtual main memories having an unused given storage capacity sufficient for said given storage requirements of said one virtual machine, in response to said means for requesting;

means for selecting one of said located virtual main memories in response to said means for monitoring, said selected virtual main memory having said dedicated relationship with another virtual machine;

means for releasing said selected virtual main memory from said dedicated relationship with said other virtual machine, in response to said means for selecting to provide availability of said selected virtual main memory;

means for informing said one virtual machine of said availability of said selected virtual main memory, in response to said means for releasing; and means for supplying access to said selected virtual main memory for said one virtual machine, in response to said means for informing.

2. A virtual memory control system for a virtual machine system having a real machine for allocating portions thereof as a plurality of virtual machines and for assigning portions of a main memory coupled said real machine as virtual main memories, respectively, for respective ones of said virtual machines in which a first virtual main memory of said virtual main memories is in a storage overload state due to insufficient storage capacity for storage requirements of a respective first virtual machine of said virtual machines and a second virtual main memory of said virtual main memories is not in a storage overload state due to excess storage capacity for storage requirements of a respective second virtual machine of said virtual machines, said virtual memory control system comprising:

a first control module for controlling said first virtual main memory;

a second control module for controlling said second virtual main memory;

a monitoring module for monitoring storage capacities of all said virtual main memories;

said first control module comprising means for detecting said storage overload state of said first virtual main memory and for providing a detection output, means for requesting access to a virtual main memory not in a storage overload state in response to said detection output and for providing an access request, and means for providing access to a virtual main memory not in storage overload state to said first virtual machine in response to said access request;

said second control module comprising means for releasing said second virtual main memory from assignment to said second virtual machine in response to a release request from said monitoring module, and means for information said monitoring module of release of said second virtual main memory from said assignment; and said monitoring module comprising means for monitoring storage capacities of said virtual main memories to provide identification of said virtual main memories not in a storage overload state including said second virtual main memory in response to said access request, means for selecting said second virtual main memory upon said identification, means for requesting release of said second virtual main memory from assignment to said second virtual machine and providing release completion information in resopnse to said release of said second virtual main memory, and means for informing said first control module in response to said release completion information that said first virtual machine has access to said second virtual main memory.

* * * * *